United States Patent
Ricard et al.

(10) Patent No.: US 10,749,575 B2
(45) Date of Patent: *Aug. 18, 2020

(54) ENVIRONMENTAL CONDITION AND MEDIA COMPOSITION SENSING USING NEAR-FIELD COMMUNICATIONS

(71) Applicant: STMicroelectronics, Inc., Coppell, TX (US)

(72) Inventors: Christophe Henri Ricard, Santa Clara, CA (US); Mohammad Mazooji, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/361,048

(22) Filed: Mar. 21, 2019

(65) Prior Publication Data

US 2019/0386710 A1 Dec. 19, 2019

Related U.S. Application Data

(63) Continuation of application No. 16/012,514, filed on Jun. 19, 2018, now Pat. No. 10,284,262.

(51) Int. Cl.
*H04B 5/00* (2006.01)
*H04B 5/02* (2006.01)
(Continued)

(52) U.S. Cl.
CPC ......... *H04B 5/0043* (2013.01); *H04B 5/0031* (2013.01); *H04B 5/02* (2013.01); *H04L 67/12* (2013.01); *H04W 4/38* (2018.02)

(58) Field of Classification Search
None
See application file for complete search history.

(56) References Cited

U.S. PATENT DOCUMENTS 8,792,824 B2 * 7/2014 Moosavi ........... H04W 52/0254
455/41.1
8,971,802 B2 * 3/2015 Jones ................... H04B 5/0056
455/41.1
(Continued)

FOREIGN PATENT DOCUMENTS

CN 104732390 A 6/2015
EP 1 411 709 A2 4/2004
(Continued)

OTHER PUBLICATIONS

Azzarelli et al., "Wireless gas detection with a smartphone via rf communication," *PNAS* 111(51):18162-18166, 2014.
(Continued)

*Primary Examiner* — Tuan A Tran
(74) *Attorney, Agent, or Firm* — Seed IP Law Group LLP

(57) ABSTRACT

A method and near field communications (NFC) system for sensing at least one of an environmental condition or a composition of media in a proximity of the NFC system are provided. In the method and system, a first antenna irradiates an electromagnetic field during a sensor mode. A second antenna detects the electromagnetic field and outputs a voltage representative of the detected electromagnetic field. An NFC controller receives a signal representative of the voltage. The NFC controller determines at least one of the environmental condition or the composition of media based on an association stored in memory between the voltage and the at least one of the environmental condition or the composition of media.

21 Claims, 6 Drawing Sheets

(51) Int. Cl.
*H04L 29/08* (2006.01)
*H04W 4/38* (2018.01)

(56) References Cited

U.S. PATENT DOCUMENTS

| | | | | |
|---|---|---|---|---|
| 8,989,660 | B2* | 3/2015 | Sabouri | H04W 52/0245 |
| | | | | 455/41.1 |
| 8,994,510 | B2 | 3/2015 | Restiau | |
| 9,020,428 | B2* | 4/2015 | Meunier | H04N 5/23229 |
| | | | | 455/41.1 |
| 9,054,749 | B2* | 6/2015 | Wilson | G06K 7/10217 |
| 9,252,846 | B2* | 2/2016 | Lee | H04B 5/0031 |
| 9,277,577 | B2 | 3/2016 | Van Nieuwenhuyze et al. | |
| 9,363,350 | B2* | 6/2016 | Rizkallah | H04M 1/72522 |
| 9,563,833 | B2 | 2/2017 | Swager et al. | |
| 9,608,480 | B2* | 3/2017 | Lee | H04B 5/0031 |
| 9,682,598 | B2* | 6/2017 | Lesesky | B60C 19/00 |
| 2006/0022814 | A1* | 2/2006 | Nogami | G06K 7/10079 |
| | | | | 340/505 |
| 2012/0214411 | A1* | 8/2012 | Levy | H04B 5/0075 |
| | | | | 455/41.1 |
| 2012/0315844 | A1 | 12/2012 | Cox et al. | |
| 2013/0196597 | A1 | 8/2013 | Aldana et al. | |
| 2013/0203347 | A1* | 8/2013 | Moosavi | H04W 52/0254 |
| | | | | 455/41.1 |
| 2014/0009172 | A1* | 1/2014 | Rizkallah | H04M 1/72522 |
| | | | | 324/654 |
| 2014/0148095 | A1 | 5/2014 | Smith et al. | |
| 2014/0370804 | A1 | 12/2014 | Dorning | |
| 2015/0017909 | A1* | 1/2015 | Meunier | H04N 5/23229 |
| | | | | 455/41.1 |

FOREIGN PATENT DOCUMENTS

| | | |
|---|---|---|
| EP | 1 879 364 A1 | 1/2008 |
| EP | 2 487 879 A1 | 8/2012 |
| EP | 2 533 506 A1 | 12/2012 |

OTHER PUBLICATIONS

NFC Controller Interface (NCI) Specification, Technical Specification, NFC Forum™, NCI 1.0, Nov. 6, 2012, 146 pages.
NFC Controller Interface (NCI) Technical Specification, Version 2.0, NFC Forum™, Apr. 19, 2017, 208 pages.
Tag Sensors, "Within Limits," Sep. 26, 2017, http://tag-sensors.com/, 8 pages.

* cited by examiner

ENVIRONMENTAL CONDITION AND MEDIA COMPOSITION SENSING USING NEAR-FIELD COMMUNICATIONS

BACKGROUND

Technical Field

This application is directed to a method and near field communications (NFC) system for detecting at least one of an environmental condition or a composition of media in a proximity of the NFC system, and, in particular, this application is directed to a method and NFC system for detecting at least one of an environmental condition or a composition of media in a sensor mode of the NFC system.

Description of the Related Art

NFC devices are becoming more widely adopted for short range communications. For example, contactless payment terminals use NFC for payment authorization. In addition, smartphones, laptops and other consumer electronic devices utilize NFC for short range data transfer (including photos, videos and contacts, among others). The increased adoption of NFC devices is expected to reduce their overall manufacturing cost, which together with the increased adoption facilitates their use in areas outside of data communication per se.

It is desirable to have a method and apparatus for using an NFC device in detecting at least one of an environmental condition or composition of media in a proximity of the NFC device.

BRIEF SUMMARY

NFC systems can communicate with each other over short distances. An NFC system includes an NFC controller, memory that stores firmware or source code for operating the NFC controller, one or more antennas that transmit and receive data using electromagnetic propagation and an NFC frontend device for interfacing the NFC controller to the one or more antennas.

Because the NFC system propagates electromagnetic waves or an electromagnetic field in a relatively small space near the NFC system, the NFC system may be used to detect environmental conditions or composition of media in the space or area near the system. The type of media present in the space near the NFC system affects the electromagnetic field and propagation of electromagnetic waves. Therefore, changes in the electromagnetic field or propagation of electromagnetic waves detected by the NFC system are indicative of changes in the environmental conditions or composition of media in the space near the NFC system. Examples of environmental conditions include temperature, humidity and pressure. Further, examples of the composition of media include water, air, concrete, metal and plastic, among others.

The NFC system irradiates, using a first antenna, an electromagnetic field or electromagnetic waves. The NFC system detects, using a second antenna, the electromagnetic field or waves. The detected electromagnetic field or waves is used to identify an environmental condition near the NFC system or its antennas. Or, the detected electromagnetic field or waves is used to determine the composition of media near the NFC system or its antennas.

For example, the NFC system can be mounted on a foundation of a building and used to detect cracks that may develop in the foundation, which is entirely made of concrete. When cracks form in the foundation, they are infiltrated by air, which permits passage of electromagnetic waves to a much higher degree than concrete. Therefore, when a crack forms near NFC system, the NFC system becomes a sensor and identifies a presence of the crack based on the change in detected electromagnetic field. The NFC system may also be used to detect liquid levels in containers and the opening and closing of a laptop, among other applications.

The NFC system is NFC protocol-compliant and operates in the bandwidth reserved for NFC communications in the radiofrequency (RF) spectrum. The NFC system senses the environmental condition or the composition of media during a sensor mode of operation. The sensor mode can complement other NFC modes of operation of the NFC system, such as a polling mode and a listening mode. Or the sensor mode can be used in lieu of some or all of the other modes of operation employed in NFC or NFC protocols.

DETAILED DESCRIPTION

Figure 1:
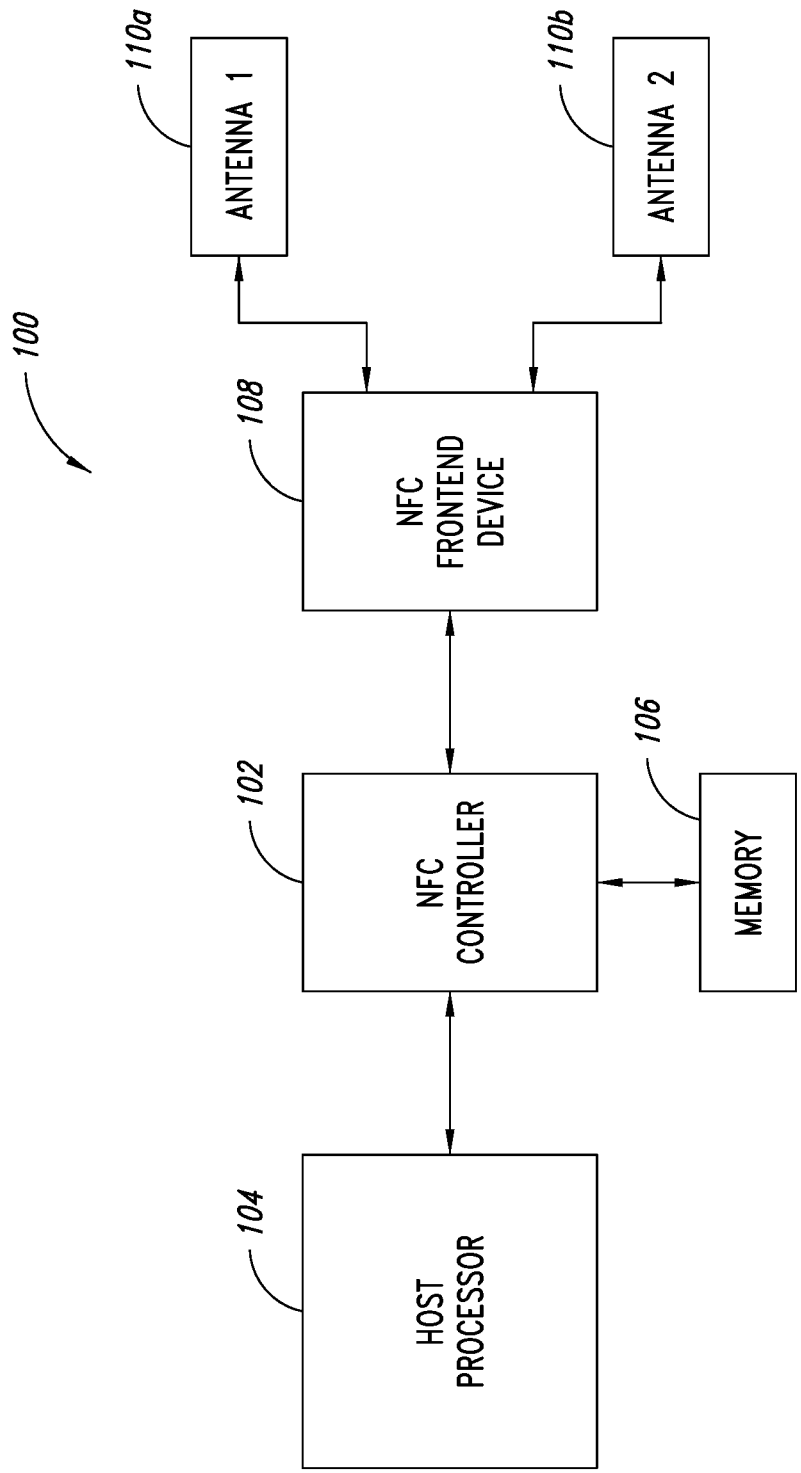
FIG. 1 shows an NFC system.

FIG. 1 shows an NFC system 100. The system 100 comprises an NFC controller 102, a host processor 104, memory 106, an NFC frontend device 108 and a first antenna 110a (denoted as 'Antenna 1') and a second antenna 110b (denoted as 'Antenna 2'). The host processor 104 is coupled to the NFC controller 102. The NFC controller 102 is coupled to both the memory 106 and the NFC frontend device 108. The NFC frontend device 108 is coupled to both the first antenna 110a and the second antenna 110b.

The memory 106 may be any type of non-transitory computer readable storage media, such as, static or dynamic memory. The memory 106 may be configured to store executable instructions, that when executed by the NFC controller 102, cause the NFC controller 102 to operate as described herein. The memory 106 may store a firmware that is accessible by the NFC controller 102. The firmware may dictate operation of the NFC controller 102 as described herein. The NFC controller 102 may be a microcontroller, a processor or a microprocessor, among others. The NFC controller 102 may also include analog-to-digital conversion (ADC) circuitry (not shown).

The NFC controller 102 may access the firmware in the memory 106. Based on the firmware, the NFC controller 102 may send an instruction or command to the NFC frontend device 108 to activate or power the first and second antennas 110 (collectively herein referred to by the numeral alone). The NFC frontend device 108 may be an antenna driver, among others. The instruction or command may instruct the NFC frontend device 108 to cause the first antenna 110a to generate (or irradiate) an electromagnetic field.

In response to sending the instruction or command, the NFC frontend device 108 causes the first antenna 110a to generate (or irradiate) an electromagnetic field. The irradiation of the electromagnetic field and electromagnetic waves is used interchangeably herein. The electromagnetic field is irradiated in a proximity of the first antenna 110a, which is a transmitting antenna. The electromagnetic field is detected by the second antenna 110b, which is a receiving antenna. The second antenna 110b is also in a proximity of the first antenna 110a. For example, the first and second antennas 110 may be co-located in a plane with spacing therebetween. The second antenna 110a outputs a voltage reflective of or representative of the detected electromagnetic field.

Environmental conditions in a proximity of the first and second antennas 110 affect the magnetic field. For example, the strength magnetic field may increase or decrease depending on a permeability of material present in the proximity of the first and second antennas 110. Different types of materials have different permeability, which is a measure of the ability of a material to support the formation of a magnetic field within itself. For example, concrete, gas, glass, plastic and liquid, among other types of materials, have different permeability. The type of material disposed in the proximity of the first and second antennas 110 thus affects the strength of the magnetic field irradiated by the first antenna 110a. Similarly, different types of materials have different permittivity, which is a measure of resistance encountered when forming an electric field in a particular media.

The permittivity of the media in the proximity of the first and second antennas also affects the electromagnetic field detected by the second antenna 110b. Consequently, the output voltage of the second antenna 110b changes as the type of media in the proximity of the first and second antennas 110 changes.

The composition of the media in the proximity of the antennas 110 influences the electromagnetic field. The electromagnetic field detected by the second antenna 110b in response to a change in the proportion of a first material, such as water or air, to a second material, such as concrete or metal, in a proximity of the second antenna 110b.

In addition to the type of media, the electromagnetic field changes in relation with environmental conditions in the proximity of the antennas 110. The environmental conditions include temperature, pressure and humidity, among others. A change in an environmental condition in the proximity of the antennas 110 causes a corresponding change in the electromagnetic field and, thus, a change in the voltage output by the second antenna 110b, and a rise or fall in temperature, pressure or humidity is reflected by the output voltage of the second antenna 110b.

The NFC front-end device 108 may be an interface between the NFC controller 102 and the antennas 110. The NFC frontend device 108, which may be an antenna matching element, drives the antennas 110. The NFC frontend device 108 detects the output voltage of the second antenna 110b. The NFC frontend device 108 may divide the output voltage. For example, the output voltage may be outside of a dynamic voltage range of the NFC controller 102, and the NFC frontend device 108 may scale (for example, by dividing) the output voltage. The NFC frontend device 108 may also digitize or sample the output voltage. The NFC frontend device 108 outputs a signal representative of the output voltage to the NFC controller 102, where the signal may be an analog signal or a digital signal in the event that the output voltage is digitized or sampled. The detected voltage may be a peak-to-peak voltage or an output voltage level of the second antenna 110b.

The NFC controller 102 receives the signal representative of the output voltage. The NFC controller 102 determines, based on the signal representative of the output voltage, an environmental condition or a composition of the media in the proximity of the antennas 110. Further, the NFC controller 102 may determine a change in the environmental condition or the media composition in the proximity of the antennas 110.

The memory 106 may store one or more lookup tables that associate the output voltage of the second antenna 110b with an environmental condition or a composition of the media the proximity of the antennas 110. The NFC controller 102 queries a table of the one or more lookup tables to identify the environmental condition or the composition of the media. For example, a lookup table may store an association between temperatures and output voltages. In response to receiving the signal representative of the output voltage, the NFC controller 102 looks up the temperature corresponding to the received output voltage indication.

The NFC controller 102 may store the identified environmental condition or composition of media. Further, the NFC controller 102 may output an indication of the identified environmental condition or composition of media to the host processor 104.

The host processor 104 may be a microprocessor or a controller, among others, of a host device that includes the NFC system 100. The host processor 104 may be a processing unit of a smartphone, laptop computer or a tablet. The host processor 104 may communicate with the controller 102 using an NFC Controller Interface (NCI) protocol. Further, the controller 102 and the host processor 104 may be connected using an Inter-Integrated Circuit ($I^2C$) serial bus, among others. Communication using the NCI protocol may occur over the $I^2C$ bus. The host processor 104 may receive the indication of the identified environmental condition or composition of media from the controller 102. Further, the host processor 104 may configure the controller 102 with one or more thresholds as described herein. The controller 102 may use the one or more thresholds for determining whether to report the identified environmental condition or composition of media to the host processor 104. For example, the controller 102 may report the identified environmental condition or composition of media if a change in the environmental condition or composition of media exceeds a threshold. The host processor 104 may cause the identified environmental condition or composition of media to be output to a user. For example, the host processor 104 may output the identified environmental condition or composition of media or information gleaned from the identified environmental condition or composition of media to a display (not shown).

It is noted that although the host processor 104 is shown in FIG. 1, the system 100 may be a standalone system that is not coupled to the host processor 104. For example, the NFC controller 102 may be coupled to an output device (not shown). The output device may be a display or a speaker, among others. Further, the output device may be a communication device, such as a modem, for transmitting data. The NFC controller 102 may directly output the identified environmental condition or composition of media or information gleaned from the identified environmental condition or composition of media to the output device.

Figure 2:
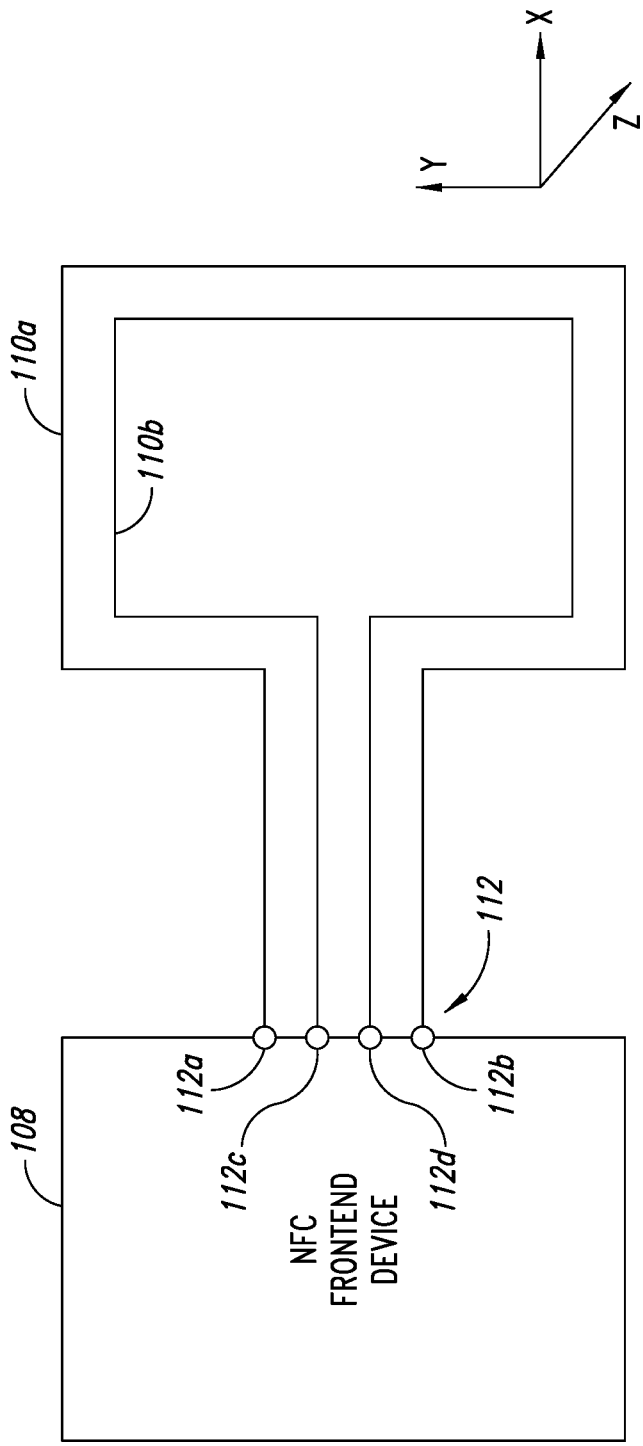
FIG. 2 shows the NFC frontend device coupled to first and second antennas of the NFC system.

FIG. 2 shows the NFC frontend device 108 coupled to the first and second antennas 110a, 110b. The NFC frontend device 108 has a plurality of nodes 112 including a first output node 112a, a second output node 112b, a first input node 112c and a second input node 112d. The first and second output nodes 112a, 112b are coupled to the first antenna 110a, and the first and second input nodes 112c, 112c are coupled to the second antenna 110b.

The first and second antennas 110a, 110b are shown to be planar antennas and lie in the same plane. The NFC frontend device 108 drives the first antenna 110a. The NFC frontend device 108 outputs a signal to the first antenna 110a using one of the first and second output nodes 112a, 112b. The signal induces the first antenna 110a to irradiate the electromagnetic field. The electromagnetic field is irradiated in a space in a proximity of the first antenna 110a. Due to the proximity of the second antenna 110b to the first antenna 110a, the generated field acts on the second antenna 110b. Further, the environmental conditions in the space as well as the composition of material that lies in the space influence the field detected by the second antenna 110b. The second antenna 110b detects the field and outputs a signal to the frontend device 108 via the first and second input nodes 112c, 112c. As described herein, a voltage received by the frontend device 108 reflects the detected field. The frontend device 108 outputs a signal representative of the voltage to the controller 102 described with reference to FIG. 1.

Environmental condition and media composition sensing may be used in a wide variety of applications. For example, media composition sensing may be used to detect cracks in concrete, such as building walls, posts or support beams. The information gleaned from media composition sensing may be used to determine the structural integrity of buildings. Furthermore, media composition sensing may be used to identify liquid level in a container, such as water level in a drinking cup or fuel level in gas tank, among others.

Figure 3B:
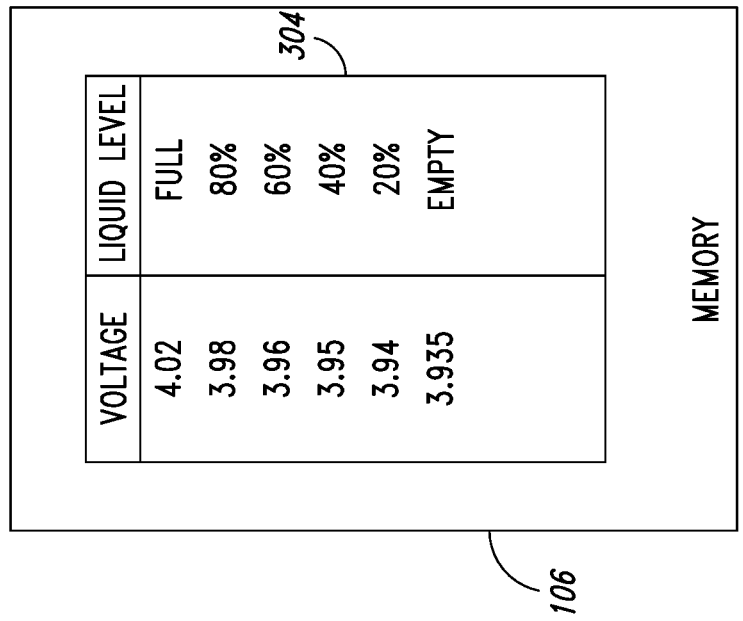
FIG. 3B shows a lookup table that associates the output voltage of the second antenna with the liquid level of the cup.
Figure 3A:
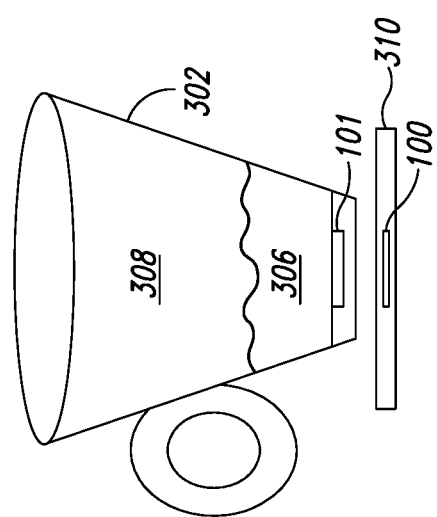
FIG. 3A shows the NFC system in accordance with an embodiment.

FIG. 3A shows the NFC system 100 in accordance with an embodiment. The NFC system is in a heat pad 310 and is used with a cup 302. The cup 302 includes a second NFC system 101, which may include an NFC tag, a thermometer, among others. The NFC system 100 identifies the cup 302 as one capable of being heated based on communication with the second NFC system 101. The NFC system 100 of the heat pad 310 is equipped with an NFC reader which can read and identify the cup 302 (or the second NFC system 101) as one capable of being heated. Once the NFC system 100 has identified the second NFC system 101, then the NFC system 100 measures the amount of liquid in the cup 302 and heat pad 310 commences heating the cup (for example, according to a prescribed schedule). The second NFC system 101 may also be equipped with a thermometer. The second NFC system 101 may report the temperature of the cup 302 to the NFC system 100. FIG. 3B shows a lookup table 304 that associates the output voltage of the second antenna 110b with the liquid level of the cup 302. The NFC system 100 as described herein identifies the cup 302 as a cup which can be heated. Liquid 306 and air 308 have different permeability and permittivity and, accordingly, impact the electromagnetic field detected by the NFC system 100 differently. As the cup 302 is filled with liquid 306, the proportion of the liquid 306 to air 308 in a proximity of the NFC system 100 increases, thereby changing the composition of the media in the proximity of the NFC system 100 and the electromagnetic field detected by the NFC system 100. As described herein, the second antenna 110b outputs an output voltage based on detecting the electromagnetic field. The output voltage is representative of the field.

The lookup table 304 associates the output voltage of the second antenna 110b with the liquid level of the cup 302. The lookup table 304 may be populated beforehand based on experimental results or observing the output voltage for a variety of liquid levels. The lookup table 304 may be developed, for example, by a manufacturer of the cup 302, based on observing the output voltage response for various liquid levels. The lookup table 304 is then stored in the memory 106 for use determining the liquid level of the cup 302.

Upon receiving the signal representative of the output voltage, the controller 102 queries or searches the table 304 to identify a liquid level corresponding to the output voltage. It is noted that in various embodiments, extrapolation may be performed for output voltage values not listed by the table 304. In an embodiment, an equation or other data structure may be used to link the output voltage to the liquid level.

The controller 102 may output the liquid level to the heat pad 310. The heat pad 310 includes a communication device (not shown), which may be a wireless or a wired communication device. Examples of the communication device include a modem and a universal serial bus (USB) port, among others. The heat pad 310 receives, via the communication device, the liquid level from the controller 102. It is noted that although a heat pad 310 is illustrated, another device, such as an electric kettle, heating pad, microwave oven, among others, may be used for heating the cup. The heat pad 310 determines a heating time or heating temperature for heating the cup 302 and liquid thereof, based on the liquid level. Because a greater amount of liquid requires a longer heating time or higher heating temperature to reach a desired temperature, the heating time or temperature determined by the heat pad 310 are generally positively correlated with the liquid level.

Figure 4B:
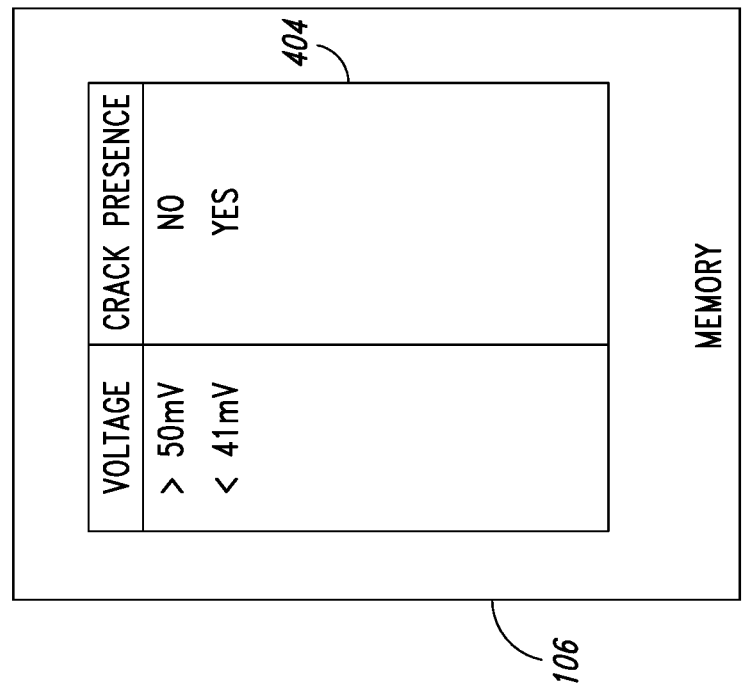
FIG. 4B shows a lookup table that associates the output voltage of the second antenna with a presence of a crack in the post.
Figure 4A:
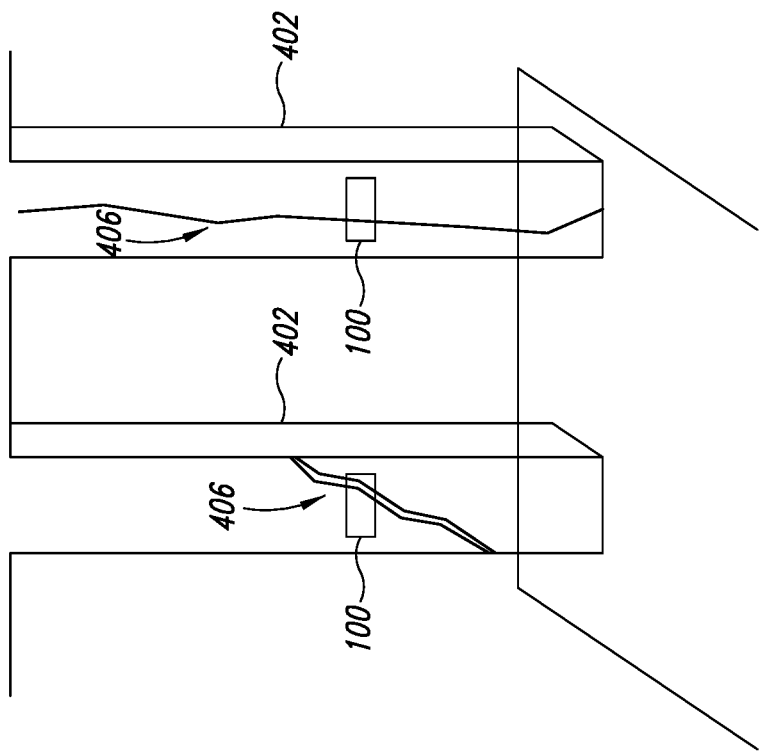
FIG. 4A shows NFC systems attached to concrete posts.

FIG. 4A shows NFC systems 100 attached to concrete posts 402 and FIG. 4B shows a lookup table 404 that associates the output voltage of the second antenna 110b with a presence or absence of a crack 406 in the post 402. The NFC system 100 may be attached to the post 402 using an adhesive or a magnet, among others. Further, the NFC system 100 may be otherwise attached to the post 402, for example, using a screw, bolt and the like.

As described herein, the NFC system 100 measures the composition of media in its proximity. As a crack 406 develops in the post 402, air or vacuum fills space previously occupied by steel. The introduction of the crack interrupts the eddy currents induced in the metal, and thereby affects the field detected by the NFC system 100.

The lookup table 404 associates the output voltage of the second antenna 110b with the presence or absence of a crack 406 in the post 402. The output voltage is related to the presence of the crack. The controller 102 of the NFC system 100 receives the signal representative of the output voltage of the second antenna 110b. The controller 102 then queries the table 404 in the memory 106 as described herein to determine a presence of the crack 406 based on the output voltage of the second antenna 110b. The controller 102 may determine whether a crack 406 is present at pre-determined intervals of time, accordingly to a set schedule or in response to a request received by the controller, where the request may be made by a user.

In response to determining the presence of the crack 406, the controller 102 may output an alarm or notification so that the structure can be inspected. As described herein, the controller 102 may be coupled to an output device, such as a display or a speaker. The controller 102 may output data indicative of the presence of a crack for display on the display or as an audio message to be output by the speaker. In an embodiment, the output device may be a communication device, such as a modem. The controller 102 may cause data indicating the presence of a crack to be transmitted using the communication device to another device. The other device may be a server that monitors the structural integrity of the structure in which the NFC system 100 is installed, whereby by the data provided by the NFC system 100 may be stored and evaluated by engineers or technicians, among others. Further, the communication device may transmit the data to a handheld device, among others.

Figure 5:
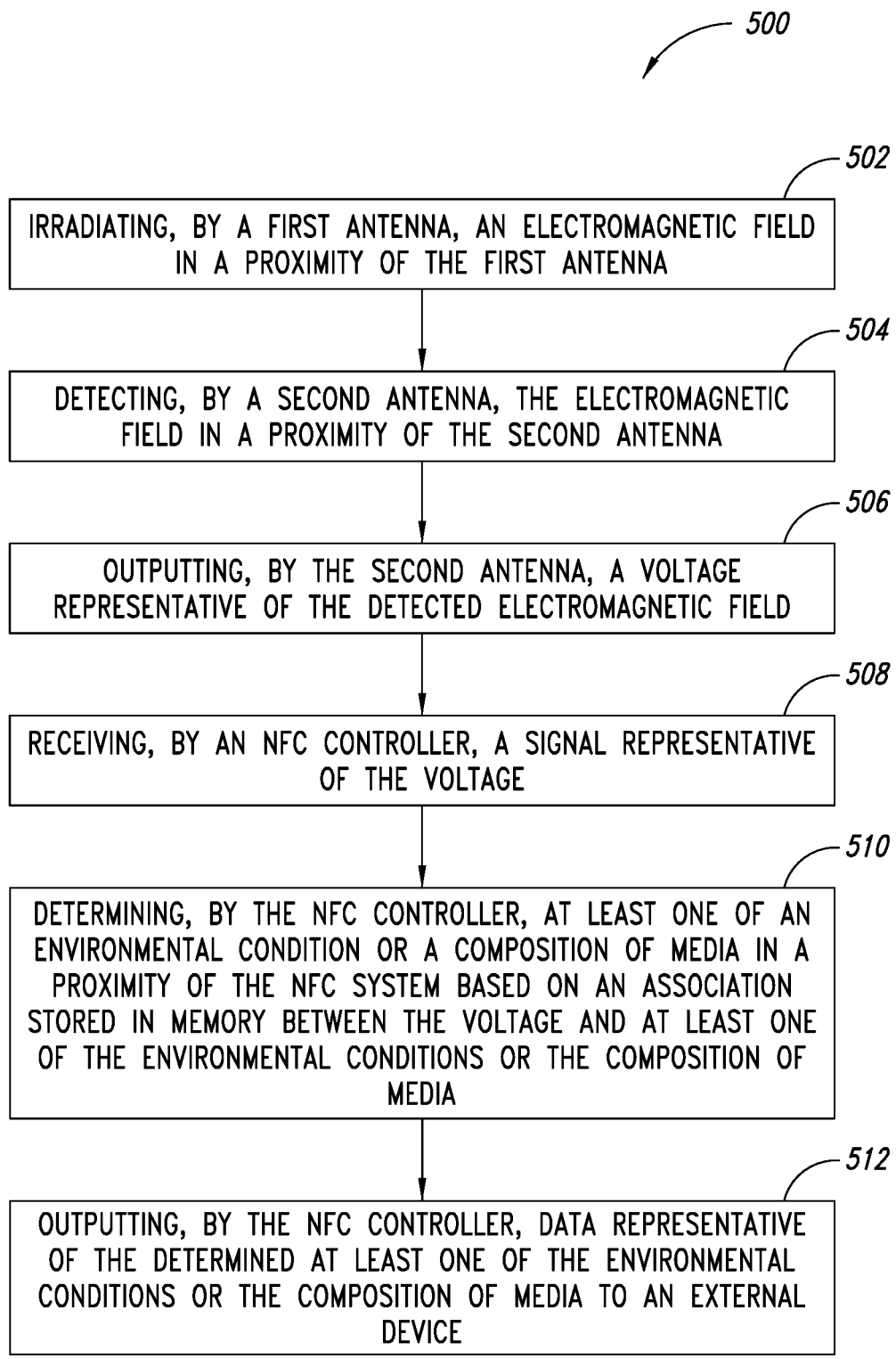
FIG. 5 shows a flow diagram of a method for determining at least one of an environmental condition or a composition of media in a proximity of the NFC system.

FIG. 5 shows a flow diagram of a method 500 for determining at least one of an environmental condition or a composition of media in a proximity of the NFC system 100. In the method 500, at 502, a first antenna, such as the first antenna 110a described with reference to FIG. 1, irradiates an electromagnetic field in a proximity of the first antenna. At 504, a second antenna, such as the second antenna 110b described with reference to FIG. 1, detects the electromagnetic field in a proximity of the second antenna. The composition of media in the vicinity of the second antenna as well as environmental conditions in the vicinity of the second antenna affect the field detected by the second antenna.

At 506, the second antenna outputs a voltage representative of the detected electromagnetic field. The voltage may be output to an NFC frontend device, such as the NFC frontend device 108 described with reference to FIG. 1. The NFC frontend device may process the voltage. The NFC frontend device may divide the voltage and perform sampling, quantization or analog-to-digital conversion on the voltage. The NFC frontend device outputs a signal representative of the voltage to an NFC controller, such as the NFC controller 102 described with reference to FIG. 1. At 508, the NFC controller receives the signal representative of the voltage.

At 510, the NFC controller determines at least one of an environmental condition or a composition of media in a proximity of the NFC system based on an association stored in memory between the voltage and the at least one of the environmental condition or the composition of media. For example, a memory, such as the memory 106 described with reference to FIG. 1 may store a lookup table that links a plurality of voltage levels with a respective plurality of measures of the at least one of the environmental condition or the composition of media.

The NFC controller may determine the at least one of the environmental condition or the composition of media by querying the voltage in the lookup table to determine the at least one of the environmental condition or the composition of media. At 512, the NFC controller outputs data representative of the determined at least one of the environmental condition or the composition of media to an external device. The external device may be a server, laptop computer or handheld device, among others.

The ability to determine an environmental condition or composition of media in a proximity or vicinity of the NFC system 100 has a variety of applications. For example, the NFC system 100 may be included in a laptop computer (or any other device with a clamshell form factor) and may determine whether the laptop computer is folded shut (i.e., closed) or open. The NFC system 100 may be in the keyboard base or the foldable screen. When the NFC system 100 is positioned in the keyboard base and the laptop is open or unfolded, the foldable screen does not interfere or obstruct with the field. Accordingly, the field detected by the second antenna 110b is stronger compared with the field detected when the laptop is folded or closed and the foldable screen interferes or obstructs the field. The difference in the field is measurable based on the voltage output of the second antenna 110b. Thus, the output voltage of the second antenna 110b may be used by the controller 102 to determine whether the laptop is open or folded.

Figure 6:
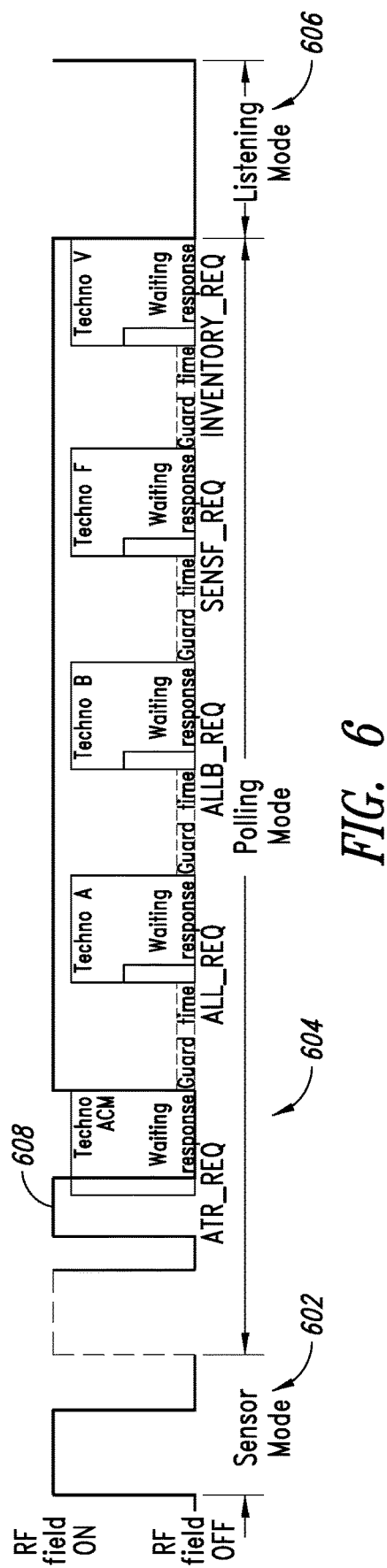
FIG. 6 shows modes of operation of the NFC system in accordance with an embodiment.

FIG. 6 shows modes of operation of an operational cycle of the NFC system 100 in accordance with an embodiment. In the cycle shown in FIG. 6, the modes of operation include a sensor mode 602, a polling mode 604 and a listening mode 606. FIG. 6 also shows a state of the field 608 generated by the NFC system 100 (either on or off) during the sensor, polling and listening modes 602, 604, 606. FIG. 6 is modified NFC Forum polling cycle that allows sensing as described herein. When a qualified sensor is not detected, the sensor mode 602 may not be performed or the sensor mode 602 may be omitted. If a qualified sensor is detected during the polling mode 604 or listening mode 606, then the sensor mode 602 is utilized. Performing the polling and listening modes 604 and 606 may be omitted or ignored until new sensor identification is performed. Periodic sensor identification may be implemented to avoid interaction with foreign objects.

During the polling mode 604, the NFC controller 102 polls NFC tags in its proximity to identify the tags for subsequent communications. Thus, the polling mode 604 is an active communication mode. The listening mode 606 is a passive communication mode (from the controller's 102 perspective). The controller 102 monitors and listens for transmission from the NFC tags, which may include responses to received requests.

The NFC system 100 performs the detection of the environmental condition or the composition of media in the sensor mode 602 (i.e., before transitioning to the polling mode 604, where various NFC tag technologies are polled). Further, the NFC controller 102 may output data representative of the determined environmental condition or composition of media to the host processor 104 during the sensor mode 602. Reporting the determined environmental condition or composition of media may be performed each cycle, during certain cycles or during cycles in which a specified condition is met.

The condition may be that a change in the determined environmental condition or composition of media meets or exceeds a threshold. For example, the NFC controller 102 may receive a command, such as an NCI command, from the host processor 104. The NCI command may be in accordance with NFC Forum, "NFC Controller Interface (NCI) Technical Specification 2.0," 2017.

The command may specify the threshold. The controller 102 may store the threshold in the memory 102. The controller 102 may also track the determined environmental condition or composition of media over time. The controller 102 stores historical data representative of the determined environmental condition or composition of media. In each cycle, during the sensor mode 602, the controller 102 may compare the determined environmental condition or composition of media with a previously determined environmental condition or composition of media. The previously determined condition or composition of media may have been determined in the sensor mode 602 of any preceding prior cycle (for example, the sensor mode 602 portion of the cycle immediately preceding the present cycle or the sensor mode 602 portion of a cycle that occurred days or months earlier).

In response to determining that the difference between the determined environmental condition or composition of media and the previously determined environmental condition or composition of media meets or exceeds the threshold, the controller 102 reports the determined environmental condition or composition of media. The controller 102 may also report the difference between the two measurements. When the threshold is not met or exceeded, the controller 102 does not report the determined environmental condition or composition of media or the difference to the host processor 104. Instead, the controller 102 continues to detect the environmental condition or composition of media and reports the detected condition or composition or a change in the detected condition or composition at a point when the change exceeds the threshold. As described herein, reporting may take place during the sensor mode 602.

As shown in FIG. 6, the NFC controller 102 activates and later deactivates the field during the sensor mode 602. When the field is activated, the first antenna 110a irradiates the field and the second antenna 110b detects the field as affected by environmental conditions or a composition of media in its proximity.

In the polling mode 604, the controller 102 communicates with NFC tags in its proximity. The controller 102 sends an attribute request (ATR_REQ) to a target tag and receives an attribute response from the tag. Further, the controller 102 sends a wake up all request (ALL_REQ) to activate tags in its proximity. The controller 102 then polls NFC tags of various technology types, such as A, B, F and V as adopted by the NFC forum.

The cycle of the operation of the NFC system 100 may be modified to incorporate the sensor mode 602. Accordingly, an NFC system 100 that is used for detecting and communicating with NFC tags may be used for sensing environmental conditions or a composition of media in its proximity.

A band of the radiofrequency (RF) spectrum near 13.56 megahertz (MHz) is reserved for and allocated to NFC-compliant devices. Usage of the NFC system 100 in sensing environmental conditions or compositions of media is advantageous in that operation in the 13.56 MHz band is permissible. That is contrary to non-NFC compliant sensors, which may not legally operate in the 13.56 MHz band. As an NFC-compliant device, the NFC system 100 may operate in the 13.56 MHz band. Thus, by using the NFC system 100, a sensor manufacturer may advantageously forego regulatory licensing and certification requirements associated with utilization of other bands of the RF spectrum.

In an embodiment, the NFC controller 102 may repeatedly operate in the sensor mode 602 without the intervening polling or listening modes 604, 606 described herein. For example, the cycle of operation of the controller 102 may only include the sensor mode 602. The sensor 602 is repeated over time or with an intervening off period. Operating solely in the sensor mode 602 (with or without the intervening off period) may be utilized in NFC systems 100 that are dedicated to environmental condition or composition of media sensing (for example, without NFC tag detection or communication functionality). For example, the NFC system 100 used in measuring the liquid level of the cup 302 described with reference to FIG. 3A and the NFC system 100 used for detecting the crack 406 in the post 402 described with reference to FIG. 4A may be dedicated to environmental condition or composition of media sensing. Because they are respectively installed in a beverage container or building foundation, the systems may be dedicated to environmental condition or composition of media sensing.

Conversely, an NFC system 100 used in detecting whether a laptop is in the closed position (is shut) or open position (with the keyboard layout accessible to a user) or an NFC system 100 used for detecting whether a tablet is covered with a cover, may not be dedicated to environmental condition or composition of media sensing. Such system that is part of a consumer electronic device may also be used for detecting and communicating with an NFC tag. Accordingly, the operational cycle of the NFC system includes the sensor mode 602 used for sensing as well as the polling and listening modes 604, 606 used for communications per the NFC protocol.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A near field communications (NFC) system, comprising:
   a first antenna, positioned on an object, configured to detect an electromagnetic field in a proximity of the first antenna and output a voltage representative of the detected electromagnetic field; and
   an NFC controller configured to:
     determine a condition of the object based on both the voltage representative of the detected electromagnetic field and an association between the voltage representative of the detected electromagnetic field and the condition of the object; and
     output data representative of the determined condition of the object.

2. The NFC system of claim 1, comprising:
   memory, coupled to the NFC controller, configured to store the association between the voltage representative of the detected electromagnetic field and the condition of the object.

3. The NFC system of claim 1, comprising:
   a second antenna configured to irradiate the electromagnetic field in a proximity of the second antenna.

4. The NFC system of claim 3, wherein the first and second antennas are planar antennas and are co-located on a same two-dimensional plane.

5. The NFC system of claim 1, wherein the condition of the object is at least one of an environmental condition of the object or a composition of media of the object.

6. The NFC system of claim 1, wherein the condition of the object is at least one of a temperature, pressure, or humidity of the object or a liquid level or an amount of air in the object.

7. The NFC system of claim 1, wherein the object is a heating pad, a drinking cup or a concrete structure.

8. The NFC system of claim 7, wherein the condition of the object is a temperature of the heating pad, a liquid level of the drinking cup or a presence of a crack in the concrete structure.

9. The NFC system of claim 1, comprising:
   a communication device coupled to the NFC controller, wherein:

the NFC controller is configured to output, to the communication device, the data representative of the determined condition of the object; and the communication device is configured to transmit the data representative of the determined condition of the object to another device.

10. A method, comprising:

detecting, by a first antenna positioned on an object, an electromagnetic field in a proximity of the first antenna;

outputting, by the first antenna, a voltage representative of the detected electromagnetic field;

determining, by an NFC controller, a condition of the object based on both the electromagnetic field and an association between the electromagnetic field and the condition of the object; and outputting, by the NFC controller, data representative of the determined condition of the object.

11. The method of claim 10, comprising:

storing the association between the electromagnetic field and the condition of the object.

12. The method of claim 10, comprising:

irradiating, by a second antenna, the electromagnetic field in a proximity of the second antenna.

13. The method of claim 10, wherein the condition of the object is at least one of an environmental condition of the object or a composition of media of the object.

14. The method of claim 13, wherein the condition of the object is at least one of a temperature, pressure, or humidity of the object or a liquid level or an amount of air in the object.

15. The method of claim 10, wherein the object is a heating pad, a drinking cup or a concrete structure and the condition of the object is a temperature of the heating pad, a liquid level of the drinking cup or a presence of a crack in the concrete structure.

16. The method of claim 10, comprising:

outputting, to a communication device, the data representative of the determined condition of the object; and transmitting, by the communication device, the data representative of the determined condition of the object to another device.

17. A system, comprising:

a first device operable to have a varying condition; and a near field communications (NFC) system mounted on the first device, the NFC system including:

a first antenna configured to detect an electromagnetic field; and an NFC controller, coupled to the first antenna, configured to:

determine the condition of the first device based on both the electromagnetic field and an association between the electromagnetic field and the condition of the first device; and output data representative of the determined condition of the first device.

18. The system of claim 17, wherein the NFC system includes memory, coupled to the NFC controller, configured to store the association between the electromagnetic field and the condition of the first device.

19. The system of claim 17, wherein the NFC system includes a second antenna configured to irradiate the electromagnetic field in a proximity of the second antenna and wherein the first and second antennas are planar antennas and are co-located on a same two-dimensional plane.

20. The system of claim 17, wherein the condition of the first device is at least one of an environmental condition of the first device or a composition of media of the first device.

21. The system of claim 17, wherein the NFC system includes a communication device coupled to the NFC controller, and wherein the NFC controller is configured to output, to the communication device, the data representative of the determined condition of the first device, and the communication device is configured to transmit the data representative of the determined condition of the first device to another device.

* * * * *